United States Patent Office 3,754,014
Patented Aug. 21, 1973

3,754,014
VAPOR PHASE REACTION OF AROMATIC NITRO COMPOUNDS TO FORM AROMATIC ISOCYANATES
Ehrenfried H. Kober, Aschau, near Kraiburg, Upper Bavaria, Germany, and Richard H. Martin, Brevard, N.C., assignors to Olin Corporation
No Drawing. Original application June 26, 1968, Ser. No. 740,059. Divided and this application June 10, 1971, Ser. No. 151,909
Int. Cl. C07c 119/04
U.S. Cl. 260—453 PC
12 Claims

ABSTRACT OF THE DISCLOSURE

In a continuous process for preparing aromatic isocyanates from the corresponding aromatic nitro compounds in the presence of a catalyst in a reaction zone at an elevated temperature, the improvement which comprises vaporizing said aroamtic nitro compound, mixing said vapor with gaseous carbon monoxide, contacting said mixture with said catalyst in said reaction zone, and withdrawing the reaction product containing aromatic isocyanate from said reaction zone. Catalysts include halides and oxides of noble metals, preferably when supported on silicon carbide. Utilizing a halide of copper as a catalyst component also improves isocyanate yields.

---

This invention is a continuation-in-part of our copending application Ser. No. 740,059, field June 26, 1968, now abandoned.

This invention relates to a process for preparing aromatic isocyanates from the corresponding aromatic nitro compounds in a vapor phase reaction.

Aromatic isocyanates are used extensively in the preparation of urethane foams, coatings, and fibers, as well as in the preparation of insecticides, pesticides and the like. Commercial processes for preparing aromatic isocyanates utilize the catalytic hydrogenation of an aromatic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an aromatic nitro compound with carbon monoxide in the presence of a catalyst in a liquid phase. For example, British Pat. No. 1,025,436 discloses a process for preparing isocyanates from the corresponding nitro compounds by reacting an aromatic nitro compound with carbon monoxide in the presence of a noble metal-based catalyst in a liquid phase. This process is not used commercially, because no more than trace amounts of aromatic isocyanates are formed when an aromatic nitro compound such as dinitrotoluene is reacted with carbon monoxide using a noble metal-based catalyst, such as rhodium trichloride, palladium dichloride, iridium trichloride, osmium trichloride and the like.

Other proposed simplified techniques utilize other catalyst systems in a liquid phase. For example, Belgian Pat. No. 672,405 entitled, "Process for the Preparation of Organic Isocyanates," describes the use of a catalyst system of a noble metal and/or a Lewis acid in the reaction between an organic nitro compound with carbon monoxide in a liquid phase reaction.

Disadvantages inherent in these liquid phase reactions for the preparation of organic isocyanates include the following:

(1) Leaching of catalyst by the liquid components may cause a relatively high catalyst loss.
(2) Solvents must be separated and recycled.
(3) High concentration of reactants causes undesirable side reactions.
(4) Catalyst must be separated from the liquid reaction products and recovered.
(5) High pressure equipment is necessary.

It is a primary object of this invention to overcome the disadvantages of previously known liquid phase techniques for preparing aromatic isocyanates from the corresponding aromatic nitro compounds.

It is a further object of this invention to provide an improved process for the preparation of aromatic isocyanates.

Another object of the invention is to provide an improved process for preparing aromatic isocyanates from the corresponding aromatic nitro compounds in a vapor phase.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished in a continuous process for preparing aromatic isocyanates from the corresponding aromatic nitro compounds in the presence of a catalyst in a reaction zone at an elevated temperature, characterized by the improvement which comprises vaporizing said aromatic nitro compound, mixing said vapor with gaseous carbon monoxide, contacting said mixture with the catalyst in the reaction zone, and withdrawing a gaseous stream containing said aromatic isocyanate from said reaction zone. Catalysts include halides and oxides of noble metals, preferably when supported on silicon carbide. Utilizing a halide of copper as a catalyst component also improves isocyanate yields.

Some of the advantages resulting from the use of the novel vapor phase technique of this invention include the following:

(1) Low catalyst loss.
(2) Solvents are unnecessary.
(3) Undesirable side reactions are minimized due to the high ratio of CO: aromatic nitro compound attainable.
(4) Catalyst separation is instantaneous.
(5) Low pressure equipment may be employed.

Any aromatic nitro compound capable of being converted to an aromatic isocyanate may be employed as a reactant. Generally, aromatic mono- or poly-nitro compounds, which may be substituted, if desired, can be reacted to form the corresponding mono- or poly-isocyanates by the novel process of this invention. The term "aromatic nitro compound," is used throughout the description and claims to define unsubstituted as well as substituted aromatic nitro compounds of the type described herein. Typical examples of suitable aromatic nitro compounds which can be reacted to form isocyanates include the following:

(I) AROMATIC NITRO COMPOUNDS
(a) Nitrobenzene
(b) Nitronaphthalenes
(c) Bis(nitrophenyl)methanes
(d) Bis(nitrophenyl)ethers
(e) Nitrodiphenoxy alkanes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted-aromatic nitro compounds which can be used are as follows:

(1) o-Nitrotoluene
(2) m-Nitrotoluene (3) p-Nitrotoluene
(4) o-Nitro-p-xylene
(5) 2-methyl-1-nitronaphthalene
(6) m-Dinitrobenzene
(7) p-Dinitrobenzene
(8) 2,4-dinitrotoluene
(9) 2,6-dinitrotoluene
(10) Dinitromesitylene
(11) 4,4-dinitrodibenzyl
(12) Bis(p-nitrophenyl)methane
(13) Bis(2,4-dinitrophenyl)methane
(14) Bis(p-nitrophenyl)ether
(15) Bis(2,4-dinitrophenyl)ether
(16) Bis(p-nitrophenoxy)ethane
(17) 2,4,6-trinitrotoluene
(18) 1,3,5-trinitrobenzene
(19) 1-chloro-2-nitrobenzene
(20) 1-chloro-4-nitrobenzene
(21) 1-chloro-3-nitrobenzene
(22) 2-chloro-6-nitrotoluene
(23) 4-chloro-3-nitrotoluene
(24) 1-chloro-2,4-dinitrobenzene
(25) 1,4-dichloro-2-nitrobenzene
(26) 1,3,5-trichloro-2-nitrobenzene
(27) 1,3,5-trichloro-2,4-dinitrobenzene
(28) 1,2-dichloro-4-nitrobenzene
(29) 1,2,4-trichloro-5-nitrobenzene
(30) 1-bromo-4-nitrobenzene
(31) 1-bromo-2-nitrobenzene
(32) 1-bromo-3-nitrobenzene
(33) 1-bromo-2,4-dinitrobenzene
(34) 1-fluoro-4-nitrobenzene
(35) 1-fluoro-2,4-dinitrobenzene
(36) 1-fluoro-2-nitrobenzene
(37) m-Nitrophenyl isocyanate
(38) p-Nitrophenyl isocyanate
(39) o-Nitroanisole
(40) p-Nitroanisole
(41) p-Nitrophenetole
(42) o-Nitrophenetole
(43) 2,4-dinitrophenetole
(44) 2,4-dinitroanisole
(45) 1-chloro-2,4-dimethoxy-5-nitrobenzene
(46) 1,4-dimethoxy-2-nitrobenzene
(47) 3,3'-dimethoxy-4,4'-dinitro-biphenyl
(48) 3,3'-dimethyl-4,4'-dinitro-biphenyl
(49) 2-isocyanato-4-nitrotoluene
(50) 4-isocyanato-2-nitrotoluene In addition, isomers and mixtures of the aforesaid aromatic nitro compounds and substituted aromatic nitro compounds may also be employed, as well as homologues and other related compounds. Compounds which have both nitro and isocyanato substituents may also be employed as a reactant.

The process of this invention is particularly effective in the conversion of aromatic nitro compounds to aromatic isocyanates. As used herein, the term "aromatic nitro compound" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred aromatic nitro compounds which may be used in the practice of this invention are the nitrobenzenes, both mono- and dinitro including isomeric mixtures thereof; the nitroalkylbenzenes, including the various toluenes and the nitrated xylenes; halogenated aromatic nitro compounds such as fluorinated mono- and di-nitrobenzenes and toluenes. Generallly, the aromatic nitro compounds and substituted aromatic nitro compounds contain from 6 to about 20 carbon atoms, and preferably from 6 to about 10 carbon atoms.

The catalyst system contains at least one halide or oxide of a noble metal such as ruthenium, rhodium, palladium, osmium, iridium, platinum, silver and gold. It is preferred that the metal be one of the platinum series, including a metal halide selected from the group consisting of halides of palladium, rhodium, platinum, iridium and mixtures thereof. Typical examples of suitable halides includes palladous dibromide, palladous dichloride, palladous difluoride, palladous diiodide, rhodium tribromide, rhodium trichloride, rhodium trifluoride, rhodium triiodide; platinic bromide, platinous bromide, platinic chloride, platinous chloride, platinic fluoride, platinous iodide, platinic iodide, ruthenium trichloride, ruthenium tetrachloride, ruthenium tetrafluoride, ruthenium hexafluoride, ruthenium tribromide, iridium tribromide, iridium tetrabromide, iridium dichloride, iridium trichloride, iridium tetrachloride, iridium triiodide, iridium tetraiodide, and mixtures thereof. Oxides of the above mentioned noble metals may also be employed, such as palladium oxide, rhodium oxide, platinium oxide, and the like.

All of the aforesaid catalysts have some effect upon increasing the yield of aromatic isocyanates, and may be used individually or admixed with one or more of the other catalysts. Some of the catalysts are significantly more effective than others. Included in these more effective catalyst systems are those based upon a compound of a noble metal selected from the group consisting of palladium halides, rhodium halides, palladium oxides, and rhodium oxides.

Halides of copper, such as cupric chloride, cupric bromide, cuprous chloride, cuprous bromide, and mixtures thereof, are preferably used as a component of the catalyst system along with the noble metal compound to improve isocyanate yields.

In addition, other compounds which may be used as a component of the catalyst system include an oxide of an element selected from the group consisting of vanadium, molybdenum, tungsten, niobium, chromium and tantalum. Suitable oxides of this type include chromic oxide ($Cr_2O_3$), chromium dioxide ($CrO_2$), and chromous oxide ($CrO$); molybdenum sesquioxide ($Mo_2O_3$), molybdenum dioxide ($MoO_2$), and molybdenum trioxide ($MoO_3$); niobium monoxide ($NbO$), niobium oxide ($NbO_2$) and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$) and vanadium pentoxide ($V_2O_5$). Mixtures of two or more of these oxides may be employed as one component of the catalyst mixture. Oxides of molybdenum and vanadium are preferably used.

Although all of the aforesaid catalyst systems have some effect upon increasing the yield of organic isocyanates, certain systems are significantly more effective than others. Included in these more effective systems are the following:

(1) Palladium dichloride and vanadium pentoxide
(2) Palladium dichloride and molybdenum dioxide
(3) Rhodium trichloride and vanadium pentoxide
(4) Rhodium trichloride and molybdenum dioxide
(5) Palladium dichloride, rhodium trichloride and vanadium pentoxide
(6) Rhodium trichloride, platinum tetrachloride and vanadium pentoxide
(7) Palladium dichloride, molybdenum dioxide and cupric bromide
(8) Palladium dichloride, rhodium trichloride, vanadium pentoxide and cupric bromide
(9) Palladium dichloride and cupric chloride
(10) Rhodium trichloride and cupric chloride
(11) Rhodium oxide and cupric chloride
(12) Palladium oxide and cupric chloride
(13) Palladium dichloride
(14) Rhodium trichloride

(15) Palladium oxide
(16) Palladium oxide and cupric chloride
(17) Rhodium oxide
(18) Rhodium oxide and cupric chloride When two or more compounds are used as the catalyst system, the weight ratio of noble metal compound to the non-noble metal compound in the catalyst is generally in the range between about 0.01:1 and about 25.1, and preferably in the range between about 0.1:1 and about 10:1, but greater or less proportions may be employed if desired.

The catalyst system is preferably deposited on a silicon carbide support or carrier for dispersing the catalyst system to increase its effective surface. Other suitable supports may be used if desired.

If desired, the catalyst system may be activated by pretreatment with carbon monoxide, carbon oxysulfide, phosgene, sulfonyl- and thionyl chlorides, nitrosyl chloride, phosphorus chlorides such as phosphorus trichloride, phosphoryl chloride, phosphorus pentachloride, chlorine, and the like for a suitable period of time, such as between about 5 and about 100 minutes at temperatures ranging from between about 20° C. and about 600° C.

The novel process of this invention can be carried out in any suitable apparatus adapted for vapor phase reactions. In one embodiment of the invention, means are provided for conveying the aromatic nitro compound to a vaporizer where the liquid reactant is heated to form a gas or vapor, and the resulting vapor is then fed into the bottom of a vertical tube reactor, preferably after passing the vapor through a heat exchanger or preheater. The carbon monoxide reactant is also preferably preheated to an elevated temperature prior to admixing with the gaseous aromatic nitro compound.

The vertical tube reactor is provided with suitable means for maintaining the temperature within the reactor within the desired range. The most suitable reaction temperature range will vary depending upon the boiling point of the aromatic nitro compound, the catalyst system and the isocyanate product. The operating temperature is generally in the range from about 100 to about 500° C., and preferably from about 200° to about 450° C.

The vertical reaction tube is either partially or completely filled, as desired, with the catalyst in a form which permits passage of the gaseous reaction mixture without causing an unnecessarily high pressure drop across the catalyst bed. The catalyst in the vertical reaction tube may be of the fixed bed type, the fluidized bed type, or any other convenient form. In one embodiment, the catalyst is supported on silicon carbide beads, which may be continuously withdrawn and regenerated without the need for stopping the continuous process.

The gaseous aromatic nitro compound and carbon monoxide gas may be premixed, generally by premixing in any suitable mixing nozzle and fed into the vertical reaction tube for passage through the catalyst bed. If desired, the two gaseous streams may be mixed at the bottom of the reactor tube in a suitable nozzle, or may be fed individually into the reactor tube or the catalyst bed. Best results are generally obtained when the two gaseous streams are premixed prior to passing through the catalyst bed.

The reaction product in gaseous form is withdrawn from the top of the vertical reaction tube, or any other convenient point, passed through suitable traps and condensers, and the resulting liquid phase which contains the reaction product is collected. The gas phase from the condensers may contain a substantial portion of carbon monoxide and aromatic nitro compound along with carbon dioxide. If desired, this gas stream may be recycled to the vaporizer, or may be further treated to recover unreacted aromatic nitro compound and carbon monoxide for further reaction.

The liquid phase containing the aromatic isocyanate compound collected from the condensers is then distilled or otherwise processed to separate the aromatic isocyanate product.

One advantage of the process of this invention is that it can be carried out at about atmospheric pressure thus eliminating the need for very expensive high pressure equipment that is necessary in liquid phase reactions of this type. If desired, pressures somewhat higher or lower than atmospheric pressures may be employed.

Aromatic isocyanates produced in accordance with the technique of this invention are suitable for use in preparing polyurethane compositions such as foams, coatings, fibers, and the like by reacting the aromatic isocyanate with a suitable polyester or polyether polyol in the presence of a catalyst and, if desired, a foaming agent. In addition, the aromatic isocyanates may be used in the preparation of biologically active compounds.

The following examples are presented to described the invention more fully without any intention of being limited thereby. All parts and percentages are by weight unless otherwise specified.

EXAMPLES 1–2

Apparatus used in these examples included the following:

A nitrogen container was connected by suitable conduits and valves through a heat exchanger to a mixing nozzle at the bottom of a vertical reactor tube. The reactor tube was 36 inches long with an inside diameter of approximately 0.8 inch.

A carbon monoxide container was silimarly connected through the heat exchanger to the mixing nozzle in the reactor tube. The carbon monoxide container was also connected by suitable conduits and valves to a vaporizer, and additional conduits and valves connected the vaporizer through the heat exchanger to the mixing nozzle in the bottom of the reaction tube.

A nitrobenzene container was similarly connected by suitable conduits and valves to the vaporizer through the heat exchanger to the mixing nozzle in the bottom of the reaction tube.

The reaction tube was charged to a depth of about 6 inches with Pyrex glass beads to permit final preheating, and the remainder was filled with catalyst granules of the type described below in the tables.

The reaction tube was provided with an outlet at the top, which was connected to suitable traps and condensers for collection of reaction products.

The procedure utilized in these examples was as follows:

The reaction tube was charged with glass beads and catalyst. The catalyst bed was purged with preheated dry nitrogen at reaction temperature for about one hour prior to the reaction. This purging served to drive off any remaining water and absorbed gases (e.g., $O_2$).

Nitrobenzene was charged to the vaporizer and maintained at 164° C., resulting in a nitrobenzene vapor pressure of approximately 200 torr. A preheated (165° C.) flow of carbon monoxide was passed through the vaporizer, entraining nitrobenzene vapors at the saturation vapor pressure of 200 torr, and subsequently passed through the heat exchanger which was maintained at 250° C. The vaporizer to heat exchanger connecting tube and heat exchanger to reactor injection nozzle connector were maintained at 250° C. and 300° C., reespectively. The additional carbon monoxide line led directly to the heat exchanger and then to the injection nozzle, which was fabricated with 180° opposed dual inlets to promote mixing of the gases from the two lines. Carbon monoxide and $C_6H_5NO_2$ were passed through the reactor for 50 minutes. The temperature of the reactor was controlled by a proportional temperature controller and three individually adjustable zone heaters. Reactor temperature was monitored at the top, middle, and bottom reactor zones by calibrated thermocouples, which were inserted in a 0.25 inch O.D. thermocouple well extending down the center of the reactor tube. During the course of the reaction, the following standard conditions were employed:

(1) Average reaction temperature of about 400° C.;
(2) Atmospheric pressure;
(3) Total flow, 200 cc./min. (100 cc./min., through each inlet line), and
(4) CO:$C_6H_5NO_2$ mole ratio of 6:1.

Finally, after the fifty minute reaction period, the flows of CO and $C_6H_5NO_2$ were shut off, reactor temperature was increased to 425° C., and dry nitrogen was again passed through the reactor for an additional 30 minutes. This desorbed any unreacted $C_6H_5NO_2$ and products on the catalyst bed. Infrared analysis of the trapped reactor effluent indicated the presence of isocyanate and subsequent vapor phase chromatographic analysis substantiated the presence of phenyl isocyanate.

| Example: | Catalyst |
|---|---|
| (1) | 1% $PdCl_2$ supported on silicon carbide spheres (3/16" diameter). |
| (2) | 10% $PdCl_2$ supported on silicon carbide spheres (3/16" diameter). |
| (3) | 1% PdO on silicon carbide. |

Each of these examples showed significant yields of phenyl isocyanate.

EXAMPLES 4–5

The procedure of Examples 1–3 was repeated except that the catalyst or reaction conditions were changed as indicated below.

| Example | Catalyst | Temperature, °C |
|---|---|---|
| 4 | 5% $PdCl_2$ and 5% $CuCl_2$ on silicon carbide spheres. | 300 |
| 5 | 5% $PdCl_2$/5% $RuCl_3$ on silicon carbide | 300 |

Significant yields of phenyl isocyanate were obtained in each instance.

EXAMPLES 6–8

Dinitrotoluene was reacted with carbon monoxide using a process and apparatus similar to those Examples 1–5. In Examples 6–8 the solid dinitrotoluene was preheated to a temperature of 275° C. and the resultant liquid was fed to a vaporization tube by means of a motor driven syringe to effect vaporization. The resulting vapors were reacted with carbon monoxide, as in Examples 1–5. The catalyst system and reaction temperatures were as follows:

| Example | Catalyst | Temperature, °C |
|---|---|---|
| 6 | 5% $PdCl_2$–5% $CuCl_2$ on SiC | 350 |
| 7 | do | 300 |
| 8 | 10% $PdCl_2$–1% $CuCl_2$ on SiC | 350 |

In each example substantial conversion and yield of isocyanates were obtained.

Various modifications of the invention, some of which have been referred to above, may be employed without departing from the spirit of the invention.

What is desired to be secured by Letters Patent is:

1. In a continuous process for preparing aromatic isocyanates from the corresponding aromatic nitro compounds in the presence of a catalyst in a reaction zone at an elevated temperature, the improvement which comprises vaporizing said aromatic nitro compound at a pressure up to about atmospheric pressure, reacting said vapor with said gaseous carbon monoxide in the presence of said catalyst in said reaction zone, and withdrawing the reaction product containing aromatic isocyanate from said reaction zone, wherein said catalyst is a noble metal compound selected from the group consisting of halides or oxides of rhodium, palladium, ruthenium, iridium, osmium or platinum.

2. The process of claim 1 wherein said process is carried out at a temperature from about 100 to about 500° C.

3. The process of claim 2 wherein said catalyst is a mixture of copper halide and said noble metal compound and the weight ratio of said noble metal compound to said copper halide is between about 0.01:1 and about 25:1.

4. The process of claim 3 wherein said noble metal compound is selected from the group consisting of palladium halides, rhodium halides, palladium oxides, rhodium oxides, and mixtures thereof.

5. The process of claim 4 wherein said catalyst is supported on silicon carbide.

6. The process of claim 5 wherein said noble metal compound is palladium chloride or rhodium chloride.

7. The process of claim 6 wherein said copper halide is copper chloride and the ratio of said noble metal compound to copper chloride is between 0.1:1 and 10:1.

8. The process of claim 7 wherein said aromatic nitro compound is selected from the group consisting of nitrobenzene, dinitrotoluene and nitroisocyanato-toluene.

9. The process of claim 8 wherein said elevated temperature is in the range between about 200° C. and about 450° C.

10. The process of claim 9 wherein said process is carried out at about atmospheric pressure.

11. The process of claim 10 wherein said catalyst is a mixture of palladium dichloride and copper chloride.

12. The process of claim 10 wherein said catalyst is a mixture of rhodium trichloride and copper chloride.

References Cited

UNITED STATES PATENTS

| 3,461,149 | 8/1969 | Hardy et al. | 260—453 |
| 3,405,156 | 10/1968 | Stern et al. | 260—453 |

FOREIGN PATENTS

| 1,025,436 | 4/1966 | Great Britain. |

LEWIS GOTTS, Primary Examiner

D. H. TORRENCE, Assistant Examiner

U.S. Cl. X.R.

252—441, 470, 472, 474